United States Patent
Kim

[19]

[11] Patent Number: 6,158,412
[45] Date of Patent: Dec. 12, 2000

[54] AIR TURBULENCE GENERATOR OF INTERNAL COMBUSTION ENGINES

[76] Inventor: Jay S. Kim, 21597 Running Branch Rd., Diamond Bar, Calif. 91765

[21] Appl. No.: 09/399,033

[22] Filed: Sep. 21, 1999

[51] Int. Cl.[7] .......................... F02M 29/06; B01D 46/42
[52] U.S. Cl. .............................. 123/306; 55/413; 55/457; 60/299; 123/590; 138/39
[58] Field of Search ..................................... 123/306, 590; 55/413, 447, 455, 456, 457; 60/272, 299; 138/39

[56] References Cited

U.S. PATENT DOCUMENTS

| | | | |
|---|---|---|---|
| 1,300,015 | 4/1919 | Reed | 123/590 X |
| 3,611,679 | 10/1971 | Pall | 55/457 |
| 3,877,907 | 4/1975 | Elliff | 123/590 X |
| 3,895,930 | 7/1975 | Campolong | 55/457 X |
| 4,317,663 | 3/1982 | Dollar | 123/593 X |
| 4,729,776 | 3/1988 | Elliff | 55/455 |
| 4,962,642 | 10/1990 | Kim | 123/590 X |
| 5,113,838 | 5/1992 | Kim | 123/592 |
| 5,595,157 | 1/1997 | Siew et al. | 123/306 |
| 5,685,281 | 11/1997 | Li | 123/590 |
| 5,916,134 | 6/1999 | Yang et al. | 60/299 |
| 5,947,081 | 9/1999 | Kim | 123/306 |
| 6,041,753 | 3/2000 | Lin et al. | 123/306 |

*Primary Examiner*—Tony M. Argenbright
*Attorney, Agent, or Firm*—Kenneth T. Theodore

[57] ABSTRACT

The device is utilized to create swirling, turbulent flow to the air entering an internal combustion engine, and to the exhaust gases therefrom prior to the gases entering an air pollution system. The device utilizes multiple curved and radially angled vanes to force the air into a predetermined turbulent, swirling pattern. For carbureted engines, the device is positioned between the air filter and the inlet to the carburetor and on fuel injection engines, the device is positioned at the inlet port of the intake manifold. 100% of the air which will enter the engine will have been forced into a swirling and turbulent flow by the device for maximum combustion efficiency. Within the exhaust system, the device is positioned within the exhaust tube(s) just upstream of the catalytic converter to force the gases into a swirling and turbulent flow, thereby permitting a more efficient utilization of the catalytic converter process.

11 Claims, 2 Drawing Sheets

AIR TURBULENCE GENERATOR OF INTERNAL COMBUSTION ENGINES

BACKGROUND OF THE INVENTION

1. Field of the Invention

The present invention lies within the field of internal combustion engines and specifically to the air entering the carburetor or fuel injection system of said engines. Additionally, the invention is specific to said engines which utilize air pollution devices at their exhaust gases, such as catalytic converters.

2. Description of the Prior Art

It is well known by those knowledgeable in the art that an internal combustion engine is more efficient if the air entering its combustion chamber(s) is swirling and in a turbulent state. This is true because a turbulent airflow provides a more complete and uniform mixture of air/fuel within the airflow. More complete combustion of the vapor/air/fuel mixture is accomplished thereof. Additionally, the catalytic converters used on today's' automobiles perform much more efficiently if the exhaust gases entering therein are also in a swirling, turbulent state.

U.S. Pat. No. 4,729,776 discloses an air swirling device placed within an engine air horn, over a carburetor intake port. However, the device has small vanes which can only contact 10–20% (estimated) of the air entering the port. Additionally, the device has a circular frame which is perpendicular to the airflow from the air filter, and this frame must restrict the airflow in a significant manner.

U.S. Pat. 5,113,838 discloses an air flow system, which describes vanes positioned within the air horn of an internal combustion engine and within the exhaust system of said engine. Although the patent does not describe a reduction to practice, the vanes illustrate a slot thereon to allow air to flow through to reduce any negative pressure on the backside of said vanes. This slot thereby encourages laminar flow and suppresses turbulent flow. It is the experience of the present inventor that laminar flow does not encourage mixing of fuel and air, but keeps the fuel in concentrated layers within the air stream. Turbulent airflow is the desired end result of said devices and the subject patent is in direct contradiction to that stated end.

All of the prior art has vanes which are straight. This means that the airflow must first impinge on the vanes at an acute angle, which insures a high coefficient of friction and a high loss of airflow.

SUMMARY OF THE INVENTION

The present invention consists of multiple curved vanes, with fixed attitude, placed within an air stream to impart a swirling turbulent motion and flow to the air. The vanes are positioned within the air/filter horn of a carburated internal combustion engine, between the air filter and the carburetor intake. The vanes totally circumscribe the said intake such that 100% of the air entering the carburetor must flow through said vanes. A circular upper support and a circular lower support secure the vanes in their prescribed positions and attitude. Incoming air, passing through the air filter, is immediately directed through the vanes and thereby into a swirling, circular and turbulent flow, and then into the carburetor.

Accordingly, it is an object of the present invention to provide a means to create swirling, turbulent air flow to the carburetor of an internal combustion engine, by directing the air by means of predispositioned multiple vanes in the air/filter horn.

Additionally, it is an object of the invention to import the swirling, turbulent flow to 100% of the available air within the air/filter horn, while providing minimum resistance to the airflow.

It is a further object of the invention to provide the above with a device which is economical to produce and which can be positively secured at it's intended location.

Lastly, it is an object of the invention to provide turbulent airflow to fuel injected (non-carburetor) engines.

DESCRIPTION OF THE PREFERRED EMBODIMENT

While the preferred embodiment is illustrated and described below, it is to be understood that variations will be apparent to those skilled in the art without departing from the principles of the invention. Accordingly, the invention is not to be limited to the specific form as described and illustrated but rather is to be limited only by a literal interpretation of the claims appended herein.

Figure 1:
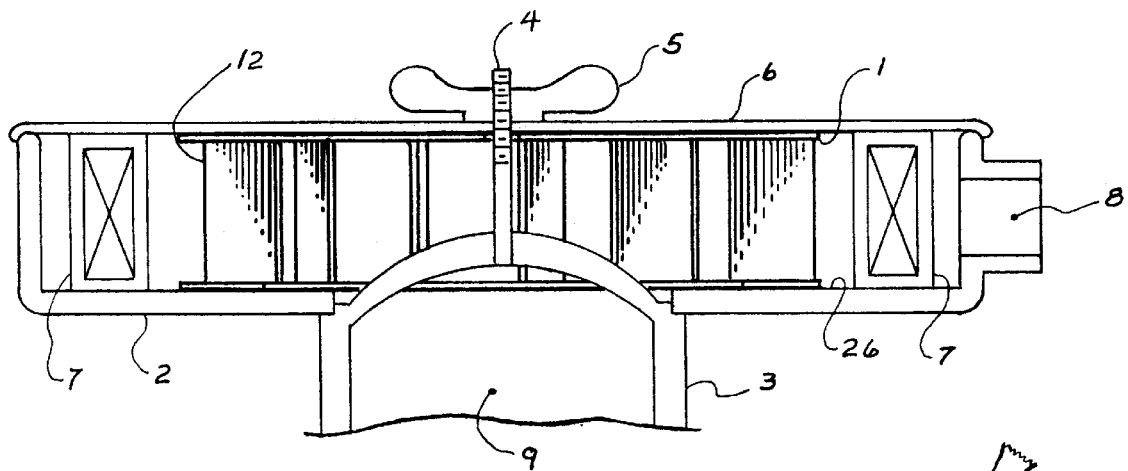
FIG. 1 is a sectional view of the intake device installed in an air/filter horn.

FIG. 1 is a sectional view of how the invention, an air intake device 1, is installed and located on an internal combustion engine (not shown). An air horn 2 is typically mounted to a carburetor 3 and secured thereto by the use of a fixed threaded rod 4 (secured to said carburetor 3) and a threaded wing nut 5. Said nut 5 presses downwardly on the air horn cover 6 which thereby flexibly presses downwardly on the typically circular air filter 7 located within said horn 2.

Figure 2:
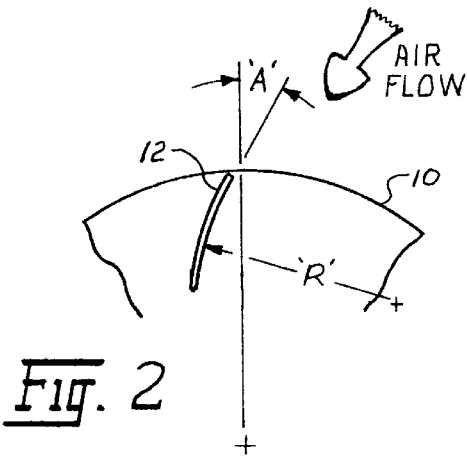
FIG. 2 is a sectional top view to illustrate the positioning of a vane in the intake device.

Air flowing to the engine enters said horn 2 via an inlet 8, through said filter 7, and into the carburetor throat 9, where fuel is mixed with the air therein. By reference to FIG. 3, the said air intake device 1 comprises a top surface 10 in parallel planar alignment to a bottom surface 11. Multiple curved vanes 12 are equally spaced and affixed to and between said surfaces 10,11 and are perpendicular to said surfaces 10,11. Said surfaces 10,11 are circular and planar in shape with an outside diameter slightly less than that of the inside diameter of said filter 7 such that the said device 1 fits within said filter 7. The lower surface 11 is also circular and planar in shape but has an inside diameter clearance cutout which provides clearance for said throat 9, such that said surface 11 rests on the lower interior surface 26 of said horn 2. Said vanes 12 are generally rectangular in shape, having a straight edge which faces upstream and identified as the vane's leading edge 13. Said edge 13 of said vane 12 touches the perimeters of said surfaces 10,11 and all are positioned at a fixed angle 'A', as illustrated in FIG. 2. Said angle 'A' positions the vanes 12 such that said edge 13 (and the portion of said vane 12 immediately aft of said edge 13) is parallel to the normal airflow just as it enters said device 1. In aerodynamic terminology, said airflow has a 'zero angle of attack' with said vanes 12. This vane positioning provides the absolute minimum pressure resistance to the airflow. The fixed angle 'A' will have different values for different internal combustion engines/carburetors but will range between 15–30 degrees. Additionally, the curve of said vanes 12 is a specific radius 'R', as illustrated in FIG. 2. The said radius 'R' will have different values for different engine/carburetors but will range between 5 to 9 inches. The number of said vanes 12 will vary with the air flow requirements of each engine/carburetors but, as an example, a 7¼ inch diameter said device 1 will utilize eighteen said vanes 12.

The use of a radius 'R' on said vane 12 changes the direction of the airflow into a swirling, turbulent flow as the air passing over said vane 12. The said radius 'R' incrementally changes the direction of the airflow as it traverses along said vane and greatly reduces the vane's 12 overall drag coefficient. This insures that said airflow achieves the desired change of direction with the minimum pressure loss (and the quantity) associated with the change of direction. The use of said angle 'A' and radius 'R' is unique to the prior art and is a major element of the said device's 1 capability to create a turbulent, swirling airflow with minimum resistance to the airflow.

An aperture 14, centrally located on said surface 10 provides clearance for said rod 4 to traverse through said device 1 as it is installed within the air horn 2. Other apertures 14' are illustrated to teach that different models of air horns 2 have different location(s) and quantities of said rod 4 and that said device 1 is not limited thereby.

Figure 3:
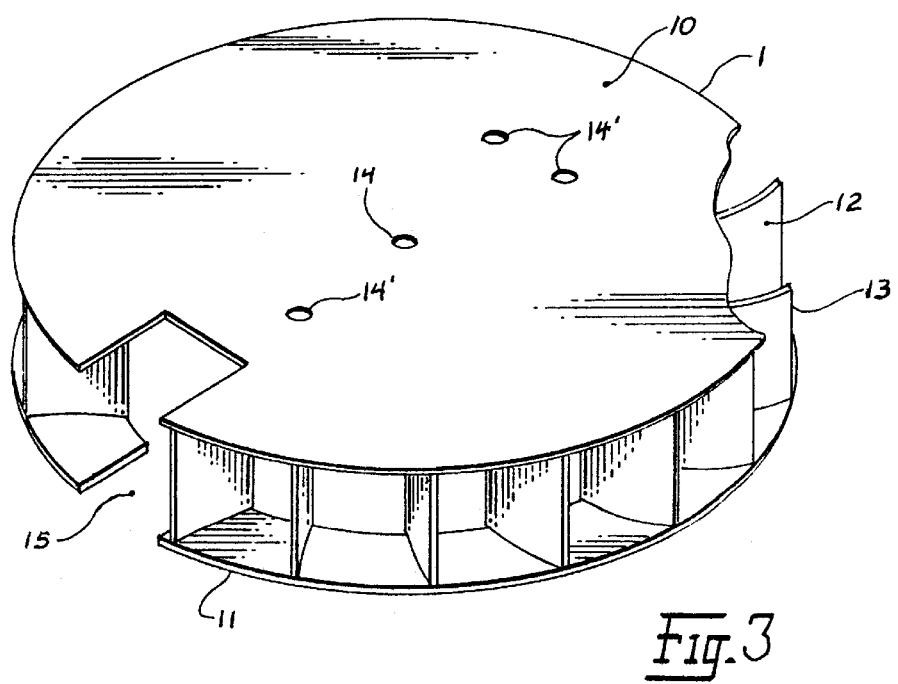
FIG. 3 is a perspective view of the intake device with a cutaway of the top surface to illustrate the vanes as installed.

FIG. 3 also illustrates a sensor cutout 15 which provides clearance for sensors (not illustrated) which are found in almost all air horns 2 today. The cutout 15 is sized and positioned on said devise 1 for each combination of air horn/carburetor. Note that both said surfaces 10,11 are shown with said cutout 15 but this does not preclude the situation where only one or even none of the said surfaces 10,11 require the cutout(s) 15.

The above teaching clearly demonstrates that said device 1 directs 100% of the airflow past said vanes 12. As both said surfaces 10,11 are in intimate contact with the internal surfaces of said air horn 2, i.e., the bottom of said cover 6 and the lower interior surface 26 of said horn 2, air can only flow between said surfaces 10,11 and not around them. The above also teaches that said device 1 contributes virtually zero resistance to the airflow. Thin sheet metal is the preferred material of fabrication for said device 1 and, as such, the thin edges of the materials (vanes 12, surfaces 10,11), which face the airflow, present virtually zero resistance to the airflow. Additionally, the above teaching describes a device 1 of a circular shape. However, to one knowledgeable in the arts, the above teachings can be applied to almost any other shapes of air horns. Square, rectangular, elliptical and the like are all possible device 1 shapes.

Several variations of the preferred embodiment are described below. The first variation eliminates the requirement of using said surfaces 10,11 by the placement of and securing said vanes 12 to the underside of said cover 6. Said vanes 12 would project downwardly within said horn 2 in a circular pattern circumscribing said carburetor throat 9 and would have the same angle 'A' and radius 'R' as if said surfaces 10,11 were present. The said vanes 12 would traverse downwardly a sufficient distance to position the lower side of said vanes 12 in a close proximity to said surface 26, such that when said cover 6 is attached by said wing nut 5, the downward bowing of said cover 6 will bring said vanes 12 in contact with said surface 26. In this manner, the vanes 12 will contact 100% of the air, and perform as taught above for said device 1. For teaching purposes, the above modification is titled an air horn cover device and is not illustrated.

Another variation of said device 1 is like the opposite of said air horn cover device, wherein said vanes 12 are attached to the said lower interior surface 26 of said horn 2, and not attached to said cover 6. Again, the said vanes 12 circumscribe said throat 9 but project upwardly to position the upper side of said vanes 12 in close proximity to said cover 6. The said cover 6 will contact the upper edges of said vanes 12 as it bows downwardly during installation with said nut 6. This variation of said device 1 is entitled an internal air horn device and is not illustrated.

A third variation of said device 1 is to incorporate said vanes 12 as an integral component of said air filter 7 such that said vanes 12 are positioned and permanently secured to the inner surface (or downstream side) of said filter 7. Said vanes 12 will have the same said angle 'A' and radius 'R' as taught above but will not require said surfaces 10,11, apertures 14 and/or cutout 15. Said vanes 12 have the same height as said filter 7, and will impact all of the air flowing through said filter 7. This variation of said device 1 is entitled air filter device and is not illustrated.

Figure 4:
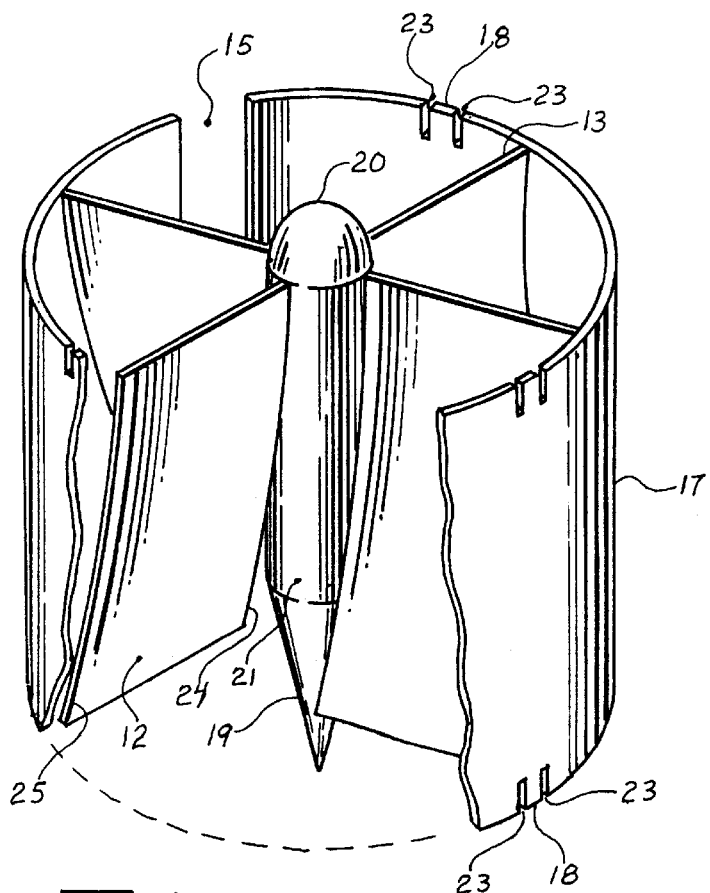
FIG. 4 is an overall perspective view of the cylindrical device.

It is well known in the art that the catalytic converters used in today's automobiles perform more efficiently if the hot gases entering therein are in a swirling, turbulent flow. This type of flow better insures that more of the exhaust gases contact the pollution reducing materials within the converter. Laminar flow is not conducive to maximizing the converter's efficiency. FIG. 4 illustrates a cylindrical device 16 which is a modification to said device 1, and which is utilized to impart a swirling, turbulent flow to the exhaust gases from an internal combustion engine. Said device 16 is inserted within the exhaust pipe just upstream of the catalytic converter.

Said device 16 consists of a cylindrical outer shell 17 having a diameter equal to or slightly less than the internal diameter of the exhaust pipe or any tube/pipe which will utilize said device 16. Axially located within said shell 17 is an aerodynamic shaped central element 19 which extends at least the length of said shell 17. Said element 19 has a simulated parabolic shaped forward end 20 extending slightly beyond the forward edge of said shell 17, and facing upstream to the exhaust flow. Said parabolic shape is aerodynamically designed to provide the least resistance to the exhaust gas flow while directing the flow to said vanes 12. The central section 21 of said element 19 is a cylindrical shape to again provide the least possible gas flow resistance and to provide supporting surface for attachment of said vane 12 thereto, as taught below. A conically shaped rearward end 22 faces downstream of the exhaust gas flow and is shaped to prevent negative pressures from being generated in the gas stream, downstream from said device 16.

Radiating outwardly from said element 19, to the inner diameter of said shell 17, are at least said vanes 12 equally positioned around said element's 19 axis. The leading edge 13 of said vane 12 face upstream. Said vanes 12 are securely attached to said section 21 and to the inner wall/diameter of said shell 17 such that the vanes 12 are angled from 15 to 20 degrees (angle 'A') to the exhaust flow as taught above. The said section 21 cylindrical shape permits the inner edge 24 of said vanes 12 to be in physical contact therewith for approximately 70% of it's length. The outer edge 25 of said vanes 12 are in contact with 100% of said shell 17, with minor shaping of said edge 25 to conform to the curved surface of said shell 17. This physical contact permits the joining of said shell 17, vanes 12, and element 19 into a rigid and permanent assembly by welding or brazing, which is more than strong enough to withstand the heat and vibration during use.

Figure 7:
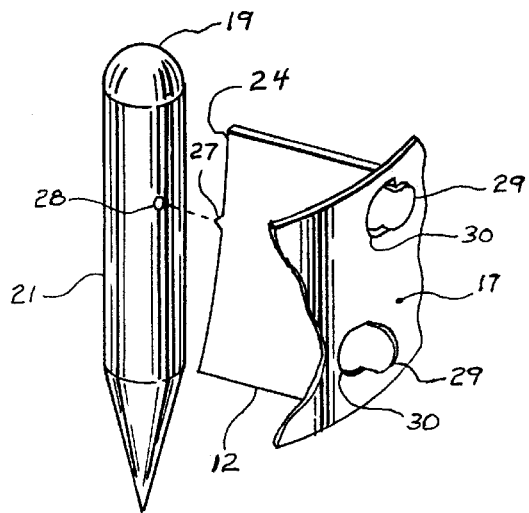
FIG. 7 is a detailed, exploded view of how the vanes are attached to the cylindrical device.

An alternate method of fabrication of said device 16 is illustrated by FIG. 7. Said vanes 12 have a pyramidal or conical shaped projection 27 approximately midway on said edge 24. Said projection 27 traverses outwardly approximately perpendicular to said edge 24. A cooperating cavity 28 is located on said section 21 to receive each said projection 27/vane 12. Said cavity 28 provides a non-interference fit with said projection 27 so that said edge 24 comes into physical contact with said element 19, which insures proper welding as described below. Said cavities 28 are located thereon in relationship to the number of said vanes 12, and to axially position said vanes 12 within said device 16.

At least two semi-circular vane extensions 29 are located on said outer edge 25, projecting outwardly from and approximately perpendicular to said edge 25. Correspondingly, mating semi-circular shaped extension openings 30, which are sized to permit said extensions 29 to traverse therethrough, are located on said shell 17 and angularly positioned thereon to affix said vanes 12 to correspond with the desired said angle 'A' and radius 'R' specific to said device 16. Said extensions 29 traverse through said openings 30 and are then bent so flat against the outer surface of said shell 17. Said extensions 29 are then spot welded to said shell 17. For teaching purposes only, the upper said extension 29 is illustrated as bent and spot welded, and the lower said extension 29 is illustrated prior to it's being bent and spot welded. The said projections 27 are subsequently inserted into said cavities 28, and the interface between them and the interface between said edge/section 24/21 are then brazed together. This fabrication method provides the strongest and most environmentally resistant device 16.

Figure 5:
FIG. 5 is a detail view of the tabs used to increase the diameter of the cylindrical device.

Multiple paired diameter adjustment tabs 18 are located upon the upper (upstream) and lower edges (downstream) of said shell 17 as shown in FIG. 5. Two parallel slits 23 are cut axially into said shell 17 such that a rectangular shaped tab 18 is formed between them, said tab 18 having a free end and a cantilevered along said shell 17. The said tabs 18 are bent radially outwardly to provide an interference fit between said device 16 and the inside diameter of the exhaust pipe, such that said device 16 (forced into the pipe with said tabs 18 pressing into the exhaust pipe wall) is permanently secured therein. For those exhaust pipes having sensors located therein, said device 16 may incorporate a sensor cutout 15 as taught above. It is to be noted that the said cutout 15, even if it must extend along the full length of said shell 17, will not impair the functionality of said tabs 18 by allowing the said shell 17 to bend. The rigid construction of said device 16, specifically the full contact of said vane edges 24,25 as taught above, make said device 16 extremely stiff and very resistant to bending.

It is to be noted that said vanes 12 project radially outward from said section 21 and not at a skewed angle. This is necessary to direct and distribute the gas flow evenly as it passes axially through the said device 16. Non-radial blades will concentrate the gas flow either at the outer or the inner portions of the gas flow.

The manufacture of said devices 1,16 can utilize materials common to the industry and which can withstand the environment in which they will operate. Said device 1 can utilize aluminum, steel and/or plastics which can withstand the moderate temperatures and vibrations of the engine compartment. Said device 16 requires metal construction which can withstand the extreme heat and vibration of the exhaust system. Welding, castings, riveting and the like are all acceptable means of fabrication, as long as the heat and vibration requirements above are met.

Figure 6:
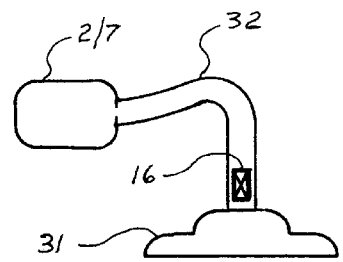
FIG. 6 is a schematic of the device installed within a fuel injection engine.

In the modem automobile of today, a fuel injection system has replaced the above described carburetor fuel system in that there is no carburetor 3 and said air horn/filter 2/7 is remote from the engine intake manifold 31. This is illustrated in the schematic of FIG. 6, which shows an air duct 32 connecting said horn/filter 2/7 to said manifold 31. The length of said duct 32 can be quiet lengthy (one to two feet) and because of this length, any turbulence induced to the airflow in said horn 2 will tend to become less turbulent as it traverses through said duct 32. It is quite probable that for a long, smooth duct 32, the airflow entering said manifold 31 will take on the characteristics of laminar flow, and thus defeat the use of said device 1 within said horn 2. To eliminate this event, said device 16 is installed within said duct 32 as close to said manifold 31 as possible, if not within the inlet to the manifold 31 itself By this manner, the air entering said manifold 31, and the engine, is guaranteed to be a turbulent and swirling airflow.

Having thus described my invention, I claim:

1. A device for imparting turbulent airflow within the air horn of a carburated internal combustion engine, which comprises parallel top and bottom planar surfaces, multiple curved rectangular shaped vanes secured perpendicular to and equally spaced perimeterly between said surfaces, a centrally located cutout within said bottom surface providing carburetor clearance for said device to lay centrally within said air horn, said vanes each having a leading edge positioned at the perimeter of said surfaces and at an angle normal to said airflow entering said device, whereby all air entering said device passes through said vanes and is redirected into a turbulent airflow prior to entering said carburetor and engine.

2. The device of claim 1 wherein at least one aperture is centrally located upon said upper surface, said vanes have a predetermined height placing said upper surface in close proximity to the air horn cover, and at least one threaded rod traverses upwardly from said carburetor through said aperture and cutout and said cover, such that a nut threadedly engaged downwardly upon said rod compresses said cover downwardly upon said device to secure said device within said air born.

3. The device of claim 1 wherein said vanes are curved to a specific radius ranging from 5 to 9 inches.

4. A device for imparting swirling, turbulent airflow to a fuel injected internal combustion engine, which comprises a cylindrical outer shell, a central element axially located within said shell, and multiple rectangular shaped curved vanes traversing radially outwardly from said element to said shell, said vanes affixed thereto with their leading edges facing upstream and at an angle normal to said airflow, whereby all air flowing through said device and vanes is redirected into a turbulent airflow, entering said engine with minimum airflow resistance.

5. The device of claim 4 wherein said element has a parabolic shaped forward end facing upstream, a conical shaped rearward end, and a cylindrical shaped central section cooperating together to provide said element with the least pressure resistance to said airflow.

6. The device of claim 5, further comprising multiple paired parallel slits axially located on the upper and the lower edges of said shell to form rectangular tabs between each said paired slits, whereby said tabs are forcibly bent radially outward enabling an incremental increase in the diameter of said device to provide an interference fit between said device and the automobile's ducts into which said device operates.

7. The device of said claim 5, further comprising multiple cavities positioned upon said central section, a projection traversing outwardly from the inner edge of each said vane for cooperative insertion into said cavity, at least two extensions projecting outwardly from the outer edge of each said vane, and at least two cooperating extension openings on said shell for each said vane, with said openings positioned thereon to affix said vane at the desired vane angle, whereby, said extensions traverse through their cooperating openings and are bent to lay flat against said shell for spotwelding thereto, and permanent welding of said prelocated cavity/projection.

8. The device of claim 5 wherein said device is utilized within the exhaust system of said engine, upstream of its catalytic converter.

9. A device for imparting turbulent airflow within the air horn of a carburated internal combustion engine, comprising multiple curved rectangular shaped vanes attached to the underside of the air horn cover, in a circular pattern circumscribing said carburetor with the lower edge of said vanes positioned in close proximity to the said air horn's internal surface, said vanes each having a leading edge positioned at an angle normal to said air flow entering said device, and said vanes are curved to a radius of 5 to 9 inches to provide incremental airflow change of direction, whereby all air entering said device passes through said vanes and is redirected into a turbulent airflow prior to entering said carburetor and engine.

10. The device of claim 9 wherein said vanes are attached to the internal surface of said air horn, and thereby said vanes project upwardly a sufficient distance to be in close proximity to said cover.

11. A device for imparting turbulent airflow to an internal combustion engine that utilizes an air filter within an air horn, which comprises multiple curved rectangular shaped vanes permanently attached to the downstream surface of said air filter, with a leading edge of each vane positioned at an angle normal to the airflow exiting said filter, and said vanes extend the fill height of said filter to encapture and redirect all of the air flowing thereto.

* * * * *